United States Patent
Müller et al.

(10) Patent No.: US 12,281,496 B2
(45) Date of Patent: Apr. 22, 2025

(54) DEVICE FOR LATCHING A DOOR OF AN OXYGEN MASK CONTAINER IN AN AIRCRAFT CABIN

(71) Applicant: Airbus Operations GmbH, Hamburg (DE)

(72) Inventors: Florian Müller, Hamburg (DE); Jan-Luca Hünting, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 20 days.

(21) Appl. No.: 18/221,952

(22) Filed: Jul. 14, 2023

(65) Prior Publication Data

US 2024/0018806 A1  Jan. 18, 2024

(30) Foreign Application Priority Data

Jul. 15, 2022 (EP) .................................... 22185218

(51) Int. Cl.

| | |
|---|---|
| B64D 11/00 | (2006.01) |
| A62B 7/14 | (2006.01) |
| A62B 25/00 | (2006.01) |
| B64D 11/06 | (2006.01) |
| B64F 5/60 | (2017.01) |
| E05B 41/00 | (2006.01) |

(Continued)

(52) U.S. Cl.
CPC ............. *E05B 47/026* (2013.01); *A62B 7/14* (2013.01); *A62B 25/005* (2013.01); *B64D 11/00* (2013.01); *B64D 11/0632* (2014.12); *B64F 5/60* (2017.01); *E05B 41/00* (2013.01); *B64D 2231/025* (2013.01); *E05B 65/06* (2013.01)

(58) Field of Classification Search
CPC ................ B64D 11/0632; B64D 11/00; B64D 2231/025; A62B 7/14
See application file for complete search history.

(56) References Cited

U.S. PATENT DOCUMENTS

| | | | |
|---|---|---|---|
| 2008/0277946 A1 | 11/2008 | Rudduck | |
| 2014/0001062 A1* | 1/2014 | Hollm | B64D 11/00 206/216 |

FOREIGN PATENT DOCUMENTS

| | | | | |
|---|---|---|---|---|
| EP | 2486958 A1 * | 8/2012 | | A62B 7/14 |
| EP | 2486958 B1 | 7/2016 | | |

OTHER PUBLICATIONS

European Search Report for Application No. 22185218 dated Dec. 12, 2022.

* cited by examiner

*Primary Examiner* — Tye William Abell
*Assistant Examiner* — Justin Michael Heston
(74) *Attorney, Agent, or Firm* — KDW Firm PLLC

(57) ABSTRACT

A device for latching a door of an oxygen mask container in an aircraft cabin includes a door for an oxygen mask container having an inner side, outer side and hinge, a first latching device attached to the inner side, and a second latching device movable relative to the first latching device to selectively engage or disengage the second latching device. A retaining element is attachable to a structural part inside the oxygen mask container. A test control device on the inner side of the door includes a movable hook element and can move the hook element to a first or second position. The hook element can engage the retaining element in the first position to restrict an opening degree of the door. The hook element is placed in the second position such that when the door is opened, the hook element is moved past the retaining element.

15 Claims, 4 Drawing Sheets

(51) Int. Cl.
   *E05B 47/02* (2006.01)
   *E05B 65/06* (2006.01)

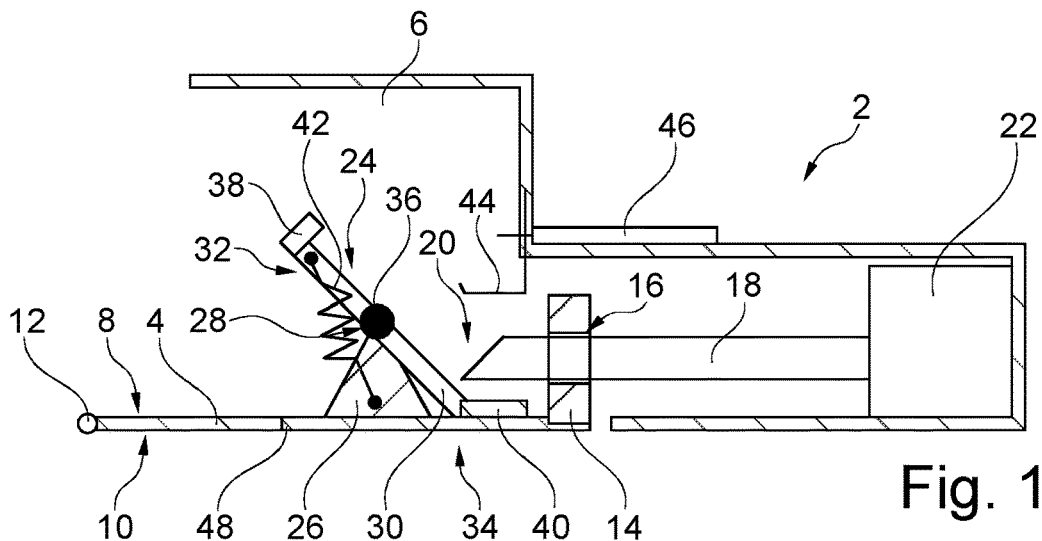
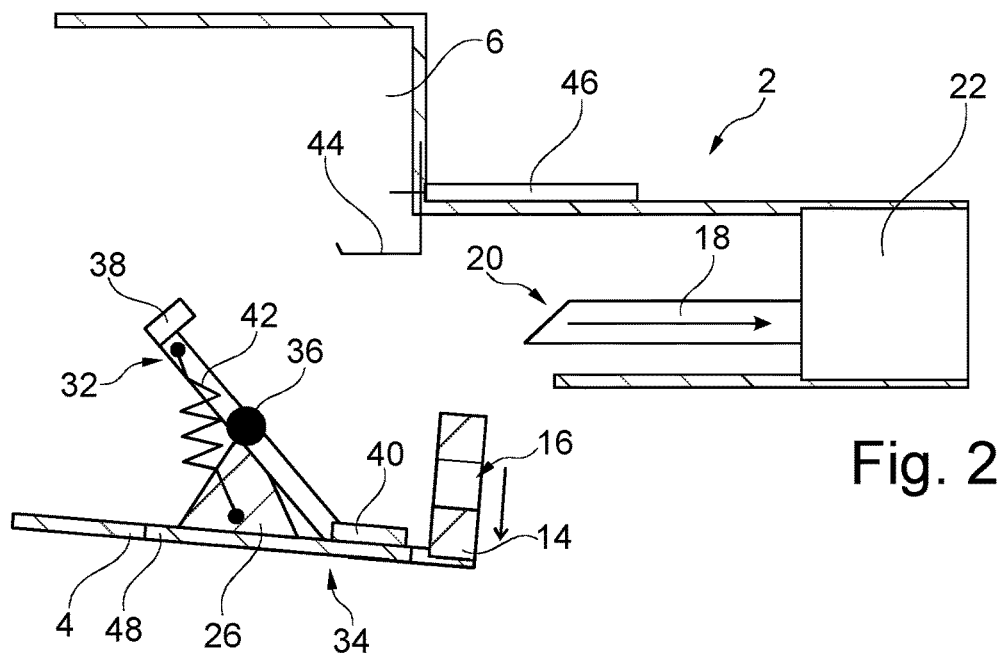
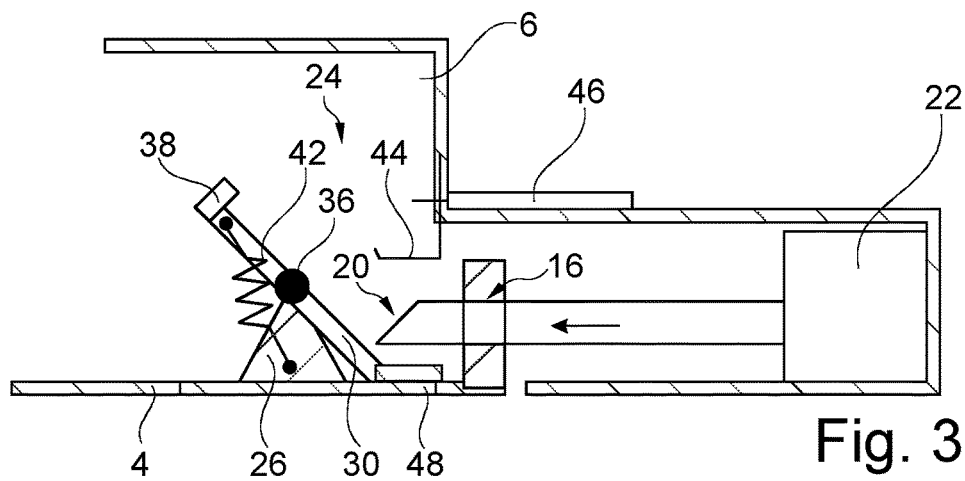

DEVICE FOR LATCHING A DOOR OF AN OXYGEN MASK CONTAINER IN AN AIRCRAFT CABIN

TECHNICAL FIELD

The disclosure herein relates to a device for latching a door of an oxygen mask container in an aircraft cabin. The disclosure herein further relates to a cabin of an aircraft as well as an aircraft having such a cabin.

BACKGROUND

Commercial aircraft with a pressurized fuselage and a cabin installed therein usually comprise a plurality of oxygen masks stored inside overhead containers, wherein the containers are opened in emergency cases to allow access to the oxygen masks. During maintenance, the oxygen mask containers are usually checked for their correct function. For this, a door of the oxygen mask container is released through energizing a lock or latch and an operator checks whether all containers open.

However, concepts exist in which a rather small number of oxygen masks is considered inside a respective container, which may even be a single mask per container. Thus, a large number of oxygen mask containers needs to be checked for their function, which includes visual checking, re-arranging the mask after opening the container, and closing the container again. This is a time consuming and cumbersome process.

SUMMARY

It is thus an object of the disclosure herein to provide an oxygen mask container or a device for latching a door of an oxygen mask container that allows a simplified and accelerated testing.

This object is met by the device for latching a door of an oxygen mask in an aircraft cabin having features disclosed herein. Advantageous embodiments and further improvements are set forth in the following description.

A device for latching a door of an oxygen mask container in an aircraft cabin is disclosed, comprising a door for an oxygen mask container having an inner side, an outer side and a hinge, a first latching device attached to the inner side of the door, a second latching device movable relative to the first latching device to selectively engage or disengage the second latching device, a retaining element attachable to a structural part inside the oxygen mask container, and a test control device arranged on the inner side of the door, wherein the test control device comprises a movable hook element, wherein the test control device is adapted to move the hook element to a first position or to a second position, wherein the hook element is able to engage the retaining element in the first position to restrict an opening degree of the door and wherein the hook element is placed in the second position such that when the door is opened, the hook element is moved past the retaining element.

The gist of the disclosure herein lies in the capability of switching a latch of a door of an oxygen mask container into a test mode and a normal operation mode. In the test mode, the respective door can be opened by releasing the latch, but the opening degree of the door is clearly restricted. In other words, a normal opening test sequence for checking the correct function of the latch can be conducted without any modification of the latching principle itself. However, the door does not need to swivel into a completely open position, in which the oxygen mask retained in the oxygen mask container partially falls out and in which the oxygen mask does not have to be re-arranged when closing the door again. However, the restricted motion of the door is still sufficiently significant to be visually checked. A test procedure with a device according to the disclosure herein can be accomplished within a clearly reduced time frame, it will also be simplified and clearly less cumbersome.

The first latching device and the second latching device are designed complementary to each other, such that they can engage or disengage. In the engaged state, the door is latched. In the disengaged state, the door is unlatched and can be opened. If the door is installed to swivel downwards, it will swivel into an open state once the first and second latching devices are disengaged. The process of engaging and disengaging can be accomplished through a drive unit, which moves one of the first or second latching device.

The first latching device is attached to the inner side of the door and is thus structurally fixed to the door. The second latching device is supported independently from the door. For example, it may be installed on a frame or a wall of the oxygen mask container, in which the door is supported. Preferably the second latching device is connected to a drive unit, which may be coupled with a control unit to release a suitable signal for an emergency opening of the door. The drive unit may comprise a solenoid, an electric motor or the like that is capable of moving the second latching device relative to the first latching device upon receiving the respective signal.

The test control device can be manipulated to either move into the first position or into the second position. In the second position, a normal operation of the oxygen mask container is possible, i.e. the door will open to a full extent once the first and second latching devices disengage. The hook element then always has a sufficient distance to the retaining element to move past the retaining element. In the first position, the test mode is activated, and the door cannot open to a full extent, since the hook element engages with the retaining element.

Hence, before testing the latch of the door, the hook element is brought into the second position to initiate the test mode. After conducting the test, the hook element can be moved back into the second position, in which the hook element cannot engage the retaining element anymore. Thus, the respective door opening degree will not be restricted and it can be opened fully to release the respective mask.

Moving the hook element can be done by various devices, which may include dedicated actuators or by using the drive unit for driving one of the first and second latching device, as explained further below.

In an advantageous embodiment, the test control device is bi-stable and is adapted to hold the hook element in the first position and the second position automatically. In other word, when the hook element has reached the first position or the second position, an external force, a lock or any other means is not required for holding the hook element in its present position. For achieving this, the hook element may be placed on a mechanical linkage or gear that has two states, which both require an external force to be applied to leave the respective state again. The mechanical linkage or gear may thus resemble a kind of mechanical flip-flop.

In an advantageous embodiment, the test control device comprises a control rod swivably supported on the inner side of the door and carrying the hook element, wherein the test control device comprises a resilient element coupled with the control rod and the inner side of the door to hold the control rod either in a first state, in which the hook element is in the first position, or a second state, in which the hook element is in the second position. The control rod may thus be flipped between the first state and the second state, wherein the resilient element, e.g. a spring, holds the control rod in the respective state. The control rod is an elongate and preferably rigid element that is supported like a rocker. It may be made from a metallic or plastic material. It may comprise a flat cross-sectional profile, such that it does not take up much installation space of the mask container.

In an advantageous embodiment, the control rod has a first end and a second end, wherein the control rod is supported on a joint arranged between the first end and the second end, wherein the hook element is arranged on the first end. Thus, when the control rod is flipped from one state into the other, the hook element reaches the first position or the second position, respectively, to assume a desired distance to the retaining element.

In an advantageous embodiment, the control rod has an indicating tab arranged on the second end, wherein the door has an opening, through which the indicating tab protrudes when the hook element is in the first stable position. The indicating tab is used for signaling a person that a test mode is active. By mechanically coupling the indicating tab to the control rod, the position of the indicating tab is directly depending on the state of the device according to the disclosure herein.

In an advantageous embodiment, the opening is a slit, through which the control rod can swivel. The slit may preferably be dimensioned to allow the control rod and the indicating tab to reach through. The slit should be placed in a position that allows the control rod swivel without interfering with the retained oxygen mask. The control rod may thus comprise a length that exceeds the available space inside the oxygen mask container in an intermediate position between the first position and the second position. When the control rod is flipped between both positions, it partially travels through the slit.

In an advantageous embodiment, the test control device is arranged in an edge region of the door. Thus, the retaining space for an oxygen mask may be maximized and an interference between the test control device and the oxygen mask is prevented.

In an advantageous embodiment, the second latching device comprises a linearly moving latching rod, wherein the first latching device comprises a through-hole, into which the latching rod is insertable to latch the door and from which the latching rod is removable to unlatch the door. This is comparable or similar to a common latching mechanism. By moving the second latching device away from the first latching device, the door is unlatched.

In an advantageous embodiment, the test control device is arranged adjacent to the first latching device, such that the latching rod is able to engage the test control device and move the hook element from the second position into the first position. Thus, an additional active element is not required for initiating the test mode. Simply by moving the already-present second latching device towards the test control device, the test mode is entered. It is preferred if only a dedicated control unit is able to initiate this motion of the latching rod to prevent an undesired activation of the test mode. For example, this may be a test control unit, which is brought into the aircraft merely for conducting a test and only the test control unit is capable of moving the latching rod further through the through-hole to flip the control rod into the first state.

In an advantageous embodiment, the device further comprises a reversal actuator, which is adapted to move the hook element from the first position into the second position. The test control device thus does not need to be flipped into the normal operation mode manually and the test can be accomplished fully automatic.

In an advantageous embodiment, the second latching device comprises a beveled end, wherein the second latching device is adapted to engage the first latching device when the door is in a restrictedly opened state, and to advance the first latching device along the beveled end through further moving the second latching device to pull the door into a closed state. Consequently, after conducting the test, the door may even be closed automatically, which further increases the speed of the test procedure.

In an advantageous embodiment, the device further comprises a door opening sensor attachable to the door or a frame, into which the door is to be arranged, wherein the door opening sensor is adapted to detect an opening degree of the door. The door opening sensor allows to automatically analyze, whether the door opens, e.g. after moving the second latching device away from the first latching device. Handwritten notes are thus not necessary. The door opening sensor may be a distance sensor, such as a capacitive sensor. It may be connected to the above-mentioned test control unit.

The disclosure herein further relates to a cabin of an aircraft, comprising a plurality of oxygen mask containers arranged in an installation inside the cabin, wherein the plurality of oxygen mask containers each comprise a device according to the previous description. The installation may e.g. be a hat rack.

In an advantageous embodiment, the oxygen mask containers are designed for retaining at least one oxygen mask. It may be possible to provide oxygen mask containers that only retain a single mask.

Furthermore, the disclosure herein relates to an aircraft, comprising at least one cabin of the above description.

BRIEF DESCRIPTION OF THE DRAWINGS

In the following, the attached drawings are used to illustrate example embodiments in more detail. The illustrations are schematic and not to scale. Identical reference numerals refer to identical or similar elements.

FIGS. 1 and 2 shows a schematic sectional view of a device for latching a door of an oxygen mask container in a closed state (FIG. 1) and an opened state (FIG. 2).

FIGS. 3 through 5 show the device being manipulated into a test mode.

DETAILED DESCRIPTION

Figure 4:
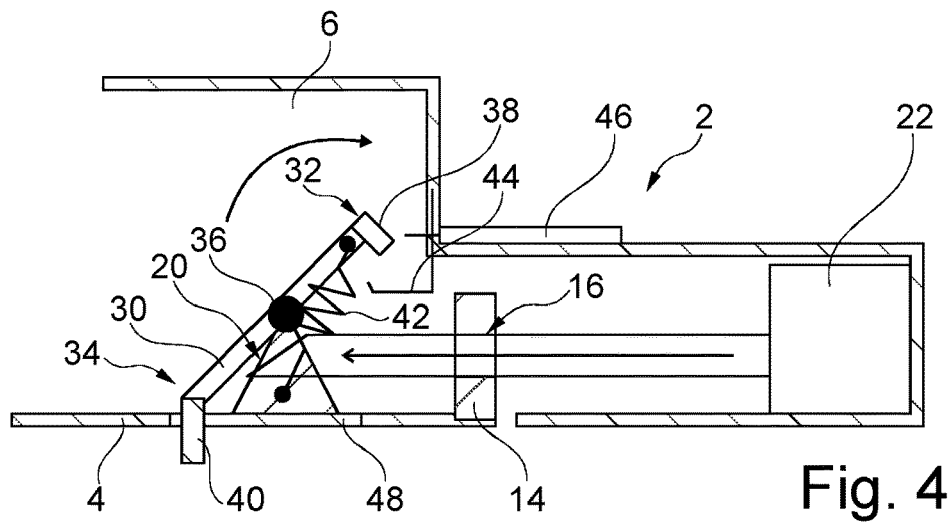
Figure 5:
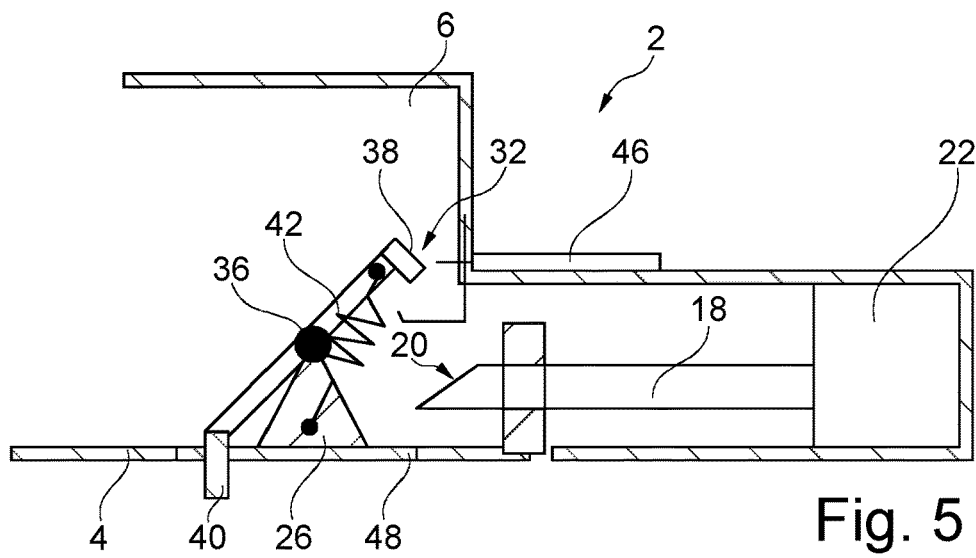

FIG. 1 shows a device 2 for latching the door 4 of an oxygen mask container 6 in an aircraft cabin. The device 2 comprises the door 4 having an inner side 8 and an outer side 10. The door 4 is swivably supported on a hinge 12 to swivel downwards to open. The size and placement of the door 4, the size of the oxygen mask container 6 as well as the placement of the hinge 12 are not to scale and are merely schematically illustrated to improve understanding the disclosure herein.

A first latching device 14 is attached to the inner side 8 of the door 4 and comprises a through-hole 16, into which a second latching device 18 can be inserted. Due to the fixed installation of the first latching device 14 to the door 4, both elements always move together. Thus, the door 4 is latched if the second latching device 18 engages the first latching device 14.

The second latching device 18 is exemplarily realized in the form of an elongate element, such as a rod, and has a beveled end 20. It is linearly movable through a first drive unit 22, which may comprise a solenoid or an electric motor. The second latching device 18 is movable linearly along its main extension axis. In the state shown in FIG. 1, the second latching device 18 is inserted into the through-hole 16, such that the first and second latching devices 14 and 18 engage. The door 4 thus remains in the closed position.

Adjacent to the first latching device 14, a test control device 24 is provided. It comprises a holder 26, which is attached to the inner side 8 of the door 4. On an inner end 28 of the holder 26, a control rod 30 is swivably supported. The control rod 30 comprises a first end 32 and an opposite second end 34. A joint 36 is arranged between the first end 32 and the second end 34, preferably in a center. On the first end 32, a hook element 38 is provided, which protrudes away from the control rod 30. On the second end 34, an indicating tab 40 is provided, which exemplarily comprises an eye-catching color and which protrudes away from the control rod 30.

Near the first end 32, a resilient element 42 in the form of a spring is coupled with the control rod 30. An opposite end of the resilient element 42 is coupled with the holder 26. The arrangement of the resilient element 42 is chosen such that it is parallel to the control rod 30 when the control rod is arranged perpendicularly to the door 4. Thus, the resilient element 42 is able to pull the first end 32 of the control rod 30 either to a side facing to the first latching device 14 or to an opposite side. Thus, the controller 30 can assume two distinct stable positions, which are maintained by the resilient element 42.

In the illustration of FIG. 1, the control rod 30, i.e. the test control device 24, is placed in a state that is referred to as a "second stable position", which does not prevent or limit an opening motion of the door 4. The opposite state is referred to as "first stable position", which is explained in other drawings.

Furthermore, a retaining element 44 is shown, which is attached to an inner structure of the oxygen mask container 6, which will be explained in further detail below. A second drive unit 46 is provided above the first latching device 14 and will also be explained in further detail below.

FIG. 2 shows the second latching element 18 in a retracted state, in which it is linearly moved away from the first latching device 14. Here, it has left the through-hole 16, such that the first latching device 14 is not held by the second latching device 18 anymore and the door 4 opens. It is to be understood, that the door 4 can open to a full extent, in which the door 4 swivels down gravity-driven and will align substantially vertically inside the aircraft cabin. Consequently, if the device 2 is in the second stable position, the door 4 can open as usual.

FIG. 3 shows the device 2 in a state comparable to FIG. 1, wherein the second latching device 2 is about to move in a direction away from the first drive unit 22, such that it is advanced through the through hole 16 towards the test control device 24. As shown in FIG. 4, the beveled end 20 engages the control rod 30 in a region between the joint 36 and the second end 34, such that the control rod 30 swivels about the joint 36 about roughly 90°. Thus, the control rod 30 assumes the above-mentioned first stable position, in which the hook element 38 is placed directly above the retaining element 44.

Figure 6:
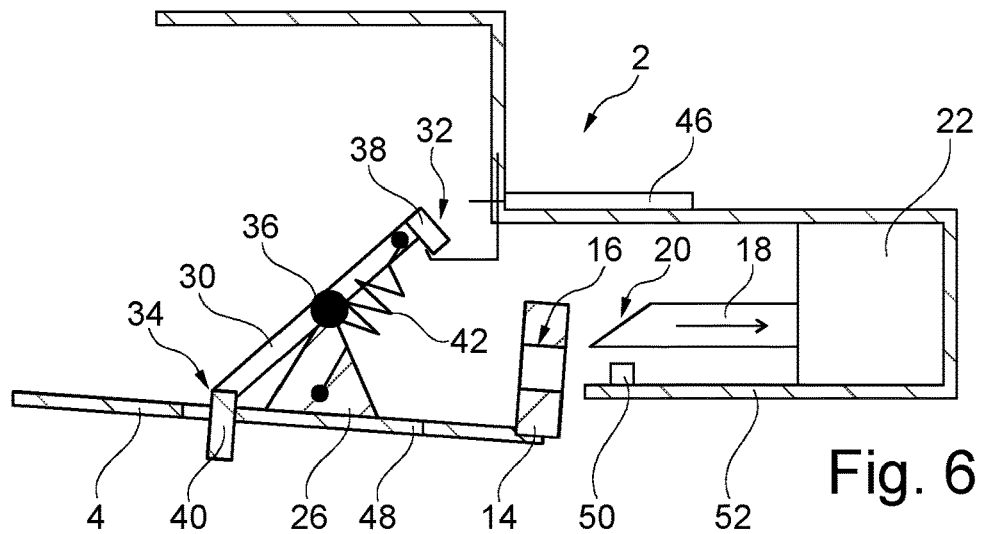
FIGS. 6 and 7 show a test opening and closing of the oxygen mask container.

After flipping the control rod 30 as shown, the second latching device 18 is retracted in the direction of the first drive unit 22 again. Now, as shown in FIG. 6, the door 4 can be opened, but the opening degree is restricted through the hook element 38, which engages with the retaining element 44 shortly after the door 4 begins to open. This is particularly useful for testing the function of opening the door 4 without the door 4 having to swivel open completely. Hence, the mask is completely retained inside the mask container 6 while the door 4 opens only partially, but clearly visibly.

When flipping the control rod 30 from the second position to the first position, the second end 34 with the attached indication tab 40 moves opposite to the first end 32. Due to an alignment angle of roughly 135° to the control rod 30 it remains inside the mask container 6 parallel to the closed door 4 in the second stable position. However, when flipping the control rod 30 over to the first stable position, the indication tab 40 is arranged perpendicularly to the door 4. It sticks out through a slit 48 in the door 4 and is clearly visible from outside the mask container 6. The visibility is further increased through the eye-catching color. This prevents maintaining the first stable position in normal operation of the aircraft.

To further simplify a test procedure, the device 2 exemplarily comprises a distance sensor 50, which is able to measure a distance between a part of the door 4 in a distance to the hinge 12 and an adjacent lining surface 52. A control unit, which is not shown herein, may be coupled to a plurality of first drive units 22 and distance sensors 52 to automatically flip over the control rods 30 of all connected devices 2 into the first stable position, initiate opening the doors 4, analyze a distance signal from the distance sensors 50, and save the results.

Figure 7:
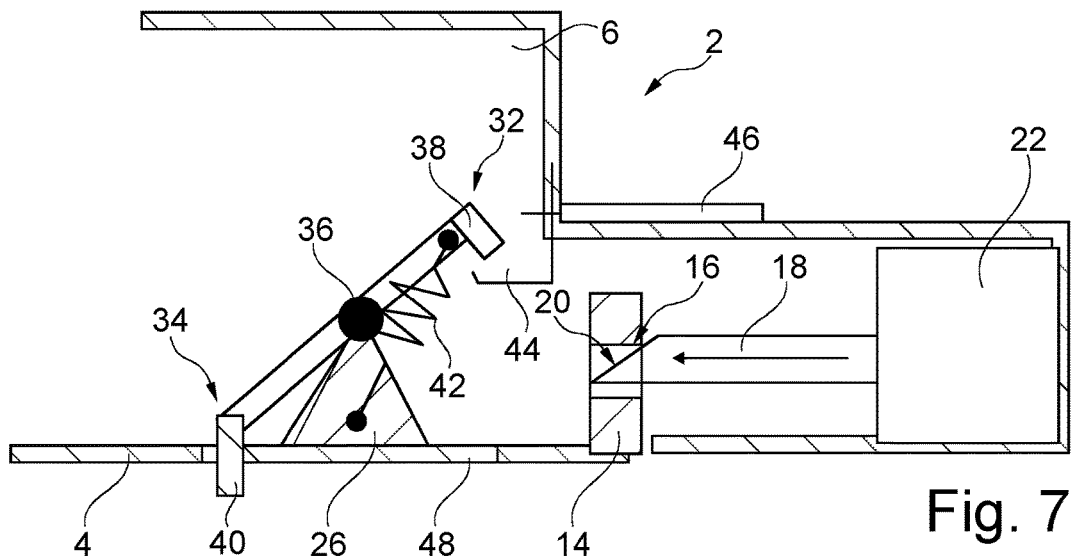
Figure 8A:
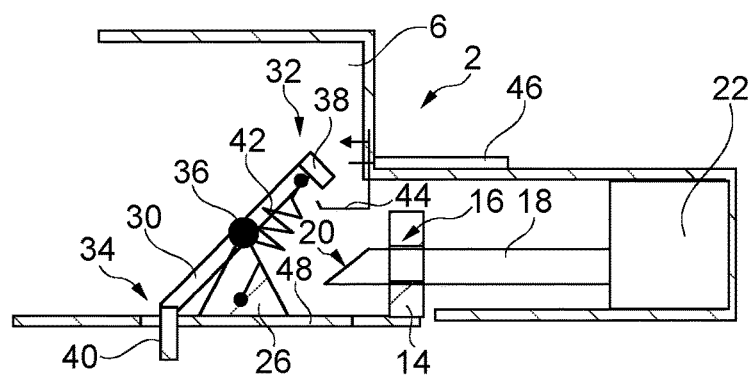
FIGS. 8a through 8c show reversing the device into a normal operation mode.
Figure 8B:
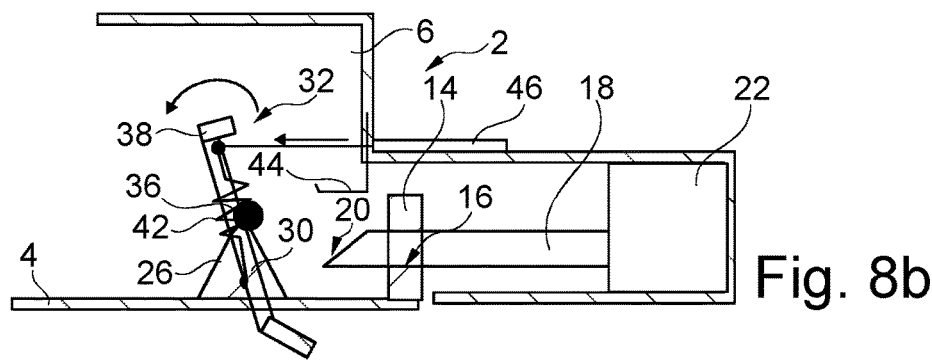
Figure 8C:
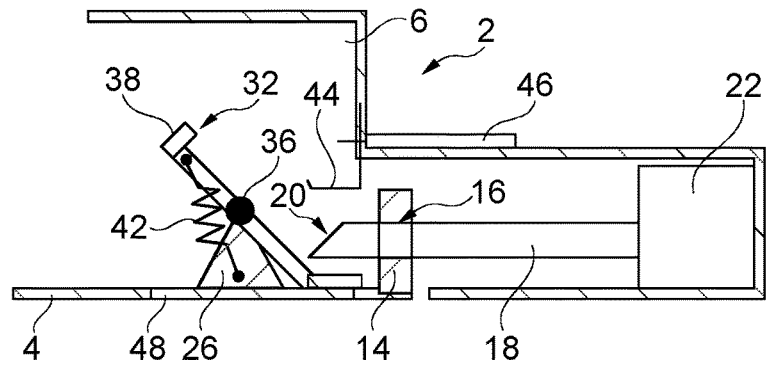

As shown in FIG. 7, the beveled end 20 is designed to engage the through-hole 16, since the trough-hole 16 has only slightly moved downwards. By extending the second latching device 18 through the through-hole 16 the beveled end 20 slides along a contour of the through-hole 16 and the first latching device 14 is pushed upwards to close the door 4 again. Thus, not only opening the door 4 can be initiated, but also closing the door 4.

Reversing the control rod 30 from the first stable position into the second stable position is conducted through the second drive unit 46, which pushes the first end 32 of the control rod 30 away from the retaining element 44. It may thus also be referred to as a reversal actuator. The indicating tab 40 moves back into the oxygen mask container 6 and a normal opening function for the door 4 is possible.

Figure 9A:
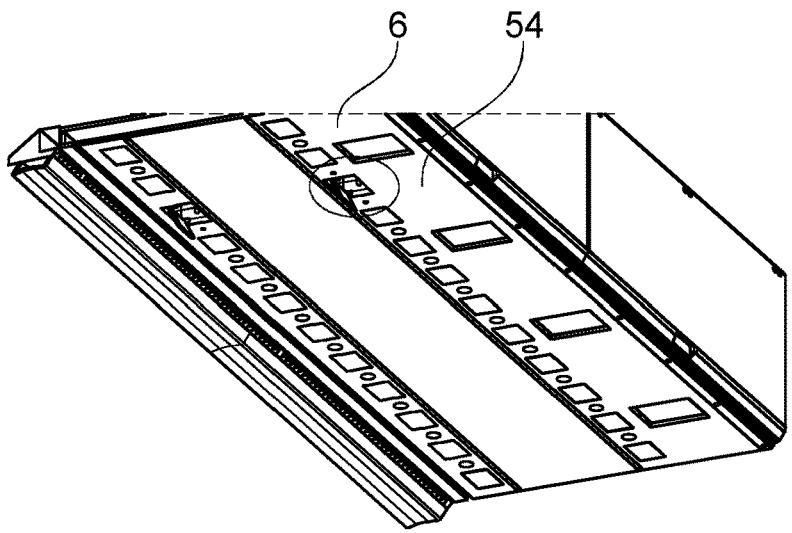
FIGS. 9a and 9b show a hat rack having oxygen mask containers.
Figure 9B:
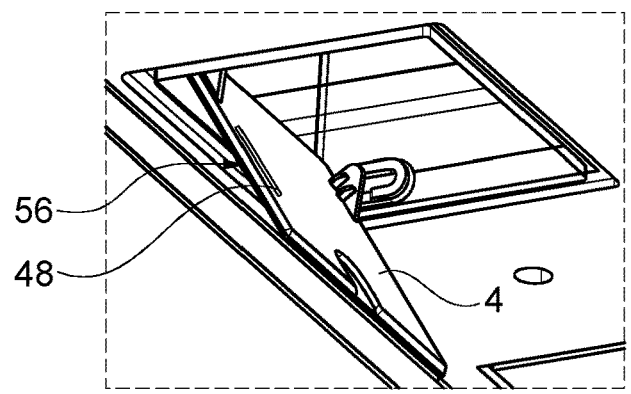

FIGS. 9a and 9b show a hat rack 54 with a plurality of oxygen mask containers 6, which are exemplarily designed for retaining a single oxygen mask each. Thus, a relatively large number of oxygen mask containers 6 and doors 4 is provided, which need to be tested. For testing, they may be equipped with the device 2 for latching the door 4 to conduct an automatic testing function. FIG. 9b shows the door 4 with the slit 48, which is arranged at an edge region 56 of the door 4. For certification purposes, the device 2 is left out in this illustration.

Figure 10:
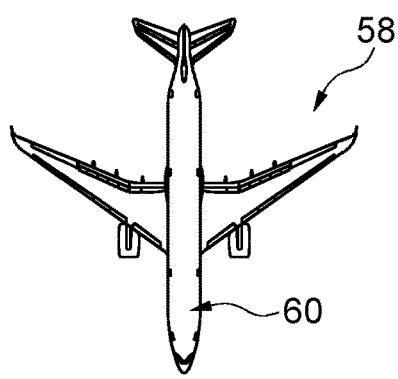
FIG. 10 shows an aircraft.

Lastly, FIG. 10 shows an aircraft 58 having an aircraft cabin 60, in which a plurality of oxygen mask containers 6 are installed.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for latching a door of an oxygen mask container in an aircraft cabin, comprising:
   a door for an oxygen mask container having an inner side, an outer side and a hinge;
   a first latching device attached to the inner side of the door;
   a second latching device movable relative to the first latching device to selectively engage or disengage the second latching device;
   a retaining element attachable to a structural part inside the oxygen mask container; and
   a test control device on the inner side of the door;
   wherein the test control device comprises a movable hook element,
   wherein the test control device is configured to move the hook element to a first position or to a second position, wherein the hook element can engage the retaining element in the first position to restrict an opening degree of the door and wherein the hook element is placed in the second position such that when the door is opened, the hook element is moved past the retaining element, and
   wherein the test control device is disposed adjacent to the first latching device, such that the second latching device is selectively movable to engage the test control device and move the hook element from the second position into the first position.

2. The device according to claim 1,
   wherein the test control device comprises a control rod swivably supported on the inner side of the door and carrying the hook element, and
   wherein the test control device comprises a resilient element coupled with the control rod and the inner side of the door to hold the control rod either in a first state or a second state.

3. The device according to claim 2,
   wherein the control rod has a first end and a second end,
   wherein the control rod is supported on a joint disposed between the first end and the second end, and
   wherein the hook element is on the first end.

4. The device according to claim 3,
   wherein the control rod has an indicating tab on the second end, and
   wherein the door has an opening, through which the indicating tab protrudes when the hook element is in the first position.

5. The device according to claim 4, wherein the opening is a slit, through which the control rod can swivel.

6. A cabin of an aircraft, comprising a plurality of oxygen mask containers disposed in an installation inside the cabin, wherein the plurality of oxygen mask containers each comprise a device according to claim 1.

7. The cabin according to claim 6, wherein the oxygen mask containers are configured for retaining at least one oxygen mask.

8. An aircraft comprising at least one cabin of claim 7.

9. An aircraft comprising at least one cabin of claim 6.

10. The device according to claim 1, wherein the test control device is bi-stable and is configured to hold the hook element in the first position and the second position automatically.

11. The device according to claim 1, wherein the test control device is disposed in an edge region of the door.

12. The device according to claim 1, comprising a reversal actuator which is configured to move the hook element from the first position into the second position.

13. The device according to claim 1, comprising:
   a door opening sensor attachable to the door or a frame, into which the door is to be disposed, and
   wherein the door opening sensor is configured to detect an opening degree of the door.

14. A device for latching a door of an oxygen mask container in an aircraft cabin, comprising:
   a door for an oxygen mask container having an inner side, an outer side and a hinge;
   a first latching device attached to the inner side of the door;
   a second latching device movable relative to the first latching device to selectively engage or disengage the second latching device;
   a retaining element attachable to a structural part inside the oxygen mask container; and
   a test control device on the inner side of the door;
   wherein the second latching device comprises a linearly moving latching rod,
   wherein the first latching device comprises a through-hole, into which the latching rod is insertable to latch the door and from which the latching rod is removable to unlatch the door,
   wherein the test control device comprises a movable hook element, and
   wherein the test control device is configured to move the hook element to a first position or to a second position, wherein the hook element can engage the retaining element in the first position to restrict an opening degree of the door and wherein the hook element is placed in the second position such that when the door is opened, the hook element is moved past the retaining element.

15. The device according to claim 14,
   wherein the second latching device comprises a beveled end, and
   wherein the second latching device is configured to engage the first latching device when the door is in a restrictedly opened state, and to advance the first latching device along the beveled end through further moving the second latching device to pull the door into a closed state.

* * * * *